United States Patent
Voccio et al.

(10) Patent No.: US 9,658,941 B2
(45) Date of Patent: May 23, 2017

(54) METHODS AND SYSTEMS OF FUNCTION-SPECIFIC TRACING

(71) Applicant: Rackspace US, Inc., San Antonio, TX (US)

(72) Inventors: Paul Voccio, Windcrest, TX (US); Matthew Charles Dietz, San Antonio, TX (US)

(73) Assignee: Rackspace US, Inc., San Antonio, TX (US)

( * ) Notice: Subject to any disclaimer, the term of this patent is extended or adjusted under 35 U.S.C. 154(b) by 0 days.

(21) Appl. No.: 13/752,234

(22) Filed: Jan. 28, 2013

(65) Prior Publication Data

US 2014/0215444 A1    Jul. 31, 2014

(51) Int. Cl.
*G06F 11/36*    (2006.01)

(52) U.S. Cl.
CPC ...... *G06F 11/3636* (2013.01); *G06F 11/3644* (2013.01)

(58) Field of Classification Search
CPC .......................... G06F 11/3636; G06F 11/364
See application file for complete search history.

(56) References Cited

U.S. PATENT DOCUMENTS

| | | | |
|---|---|---|---|
| 6,230,312 B1 | 5/2001 | Hunt | |
| 6,351,843 B1 | 2/2002 | Berkley et al. | |
| 6,381,735 B1 | 4/2002 | Hunt | |
| 6,499,137 B1 | 12/2002 | Hunt | |
| 6,546,553 B1 | 4/2003 | Hunt | |
| 6,629,123 B1 | 9/2003 | Hunt | |
| 6,718,414 B1 | 4/2004 | Doggett | |
| 6,996,808 B1 | 2/2006 | Niewiadomski et al. | |
| 7,263,689 B1 | 8/2007 | Edwards et al. | |
| 7,353,507 B2 | 4/2008 | Gazdik et al. | |
| 8,589,893 B1 * | 11/2013 | Allen | 717/130 |
| 2002/0049801 A1 * | 4/2002 | Beynon | H04L 43/00 718/102 |

(Continued)

OTHER PUBLICATIONS

Anonymous, "Valgrind Documentation Release 3.8.0", Aug. 20, 2012, pp. 1-320, XP055113787, http://valgrind.org/downloads/valgrind.

(Continued)

*Primary Examiner* — Li B Zhen
*Assistant Examiner* — Amir Soltanzadeh
(74) *Attorney, Agent, or Firm* — Dykema Gossett P.L.L.C.

(57) ABSTRACT

A system and methods are provided for function-specific tracing of a program. In one embodiment, a method includes generating a trace profile identifying one or more functions of a target program, wherein the trace profile identifies one or more functions to trace and depth of tracing for each function to be traced, loading the trace profile and the target program, identifying traced functions in the target program based on the trace profile, patching the target program to call a trace parameter for one or more functions, wherein traced functions are declared at runtime, and observing function calls for traced functions of the application. In this regard, individual functions are traced and debugged on a function-by-function basis without modifying the code or pre-arranging functions so they are traceable. As such, the scope of tracing may be dynamically limited to yield only information that is desired.

25 Claims, 8 Drawing Sheets

(56) References Cited

U.S. PATENT DOCUMENTS

2002/0199172 A1* 12/2002 Bunnell .............. G06F 11/3466
  717/128
2007/0283331 A1  12/2007  Pietrek
2011/0239194 A1   9/2011  Braude
2012/0167057 A1   6/2012  Schmich et al.

OTHER PUBLICATIONS

& Nn, "Valgrind Archive 3.8.1 screenshot", Aug. 10, 2012, pp. 1-1, http://valgrind.org/downloads/valgrind-3.8.1.tar.bz2.
Tilman Küstner et al., "Argument Controlled Profiling", Aug. 25, 2009, Technische Universität München, Germany.
Nicholas Nethercote et al, "Valgrind—A Program Supervision Framework", Electronic Notes in Theoretical Computer Science, Oct. 1, 2003, pp. 1-23, vol. 89, No. 2, Elsevier, Amsterdam, NL.

* cited by examiner

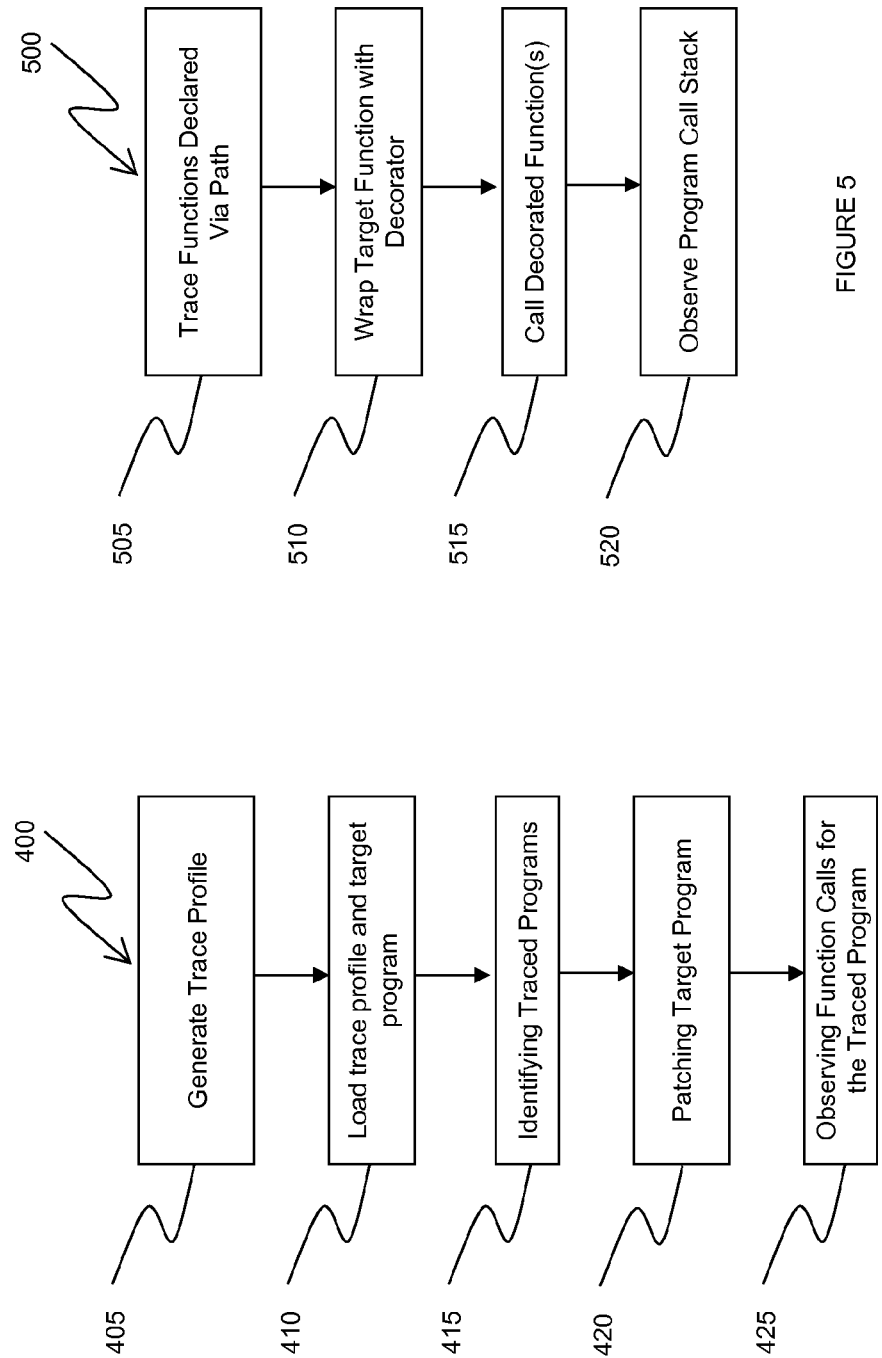

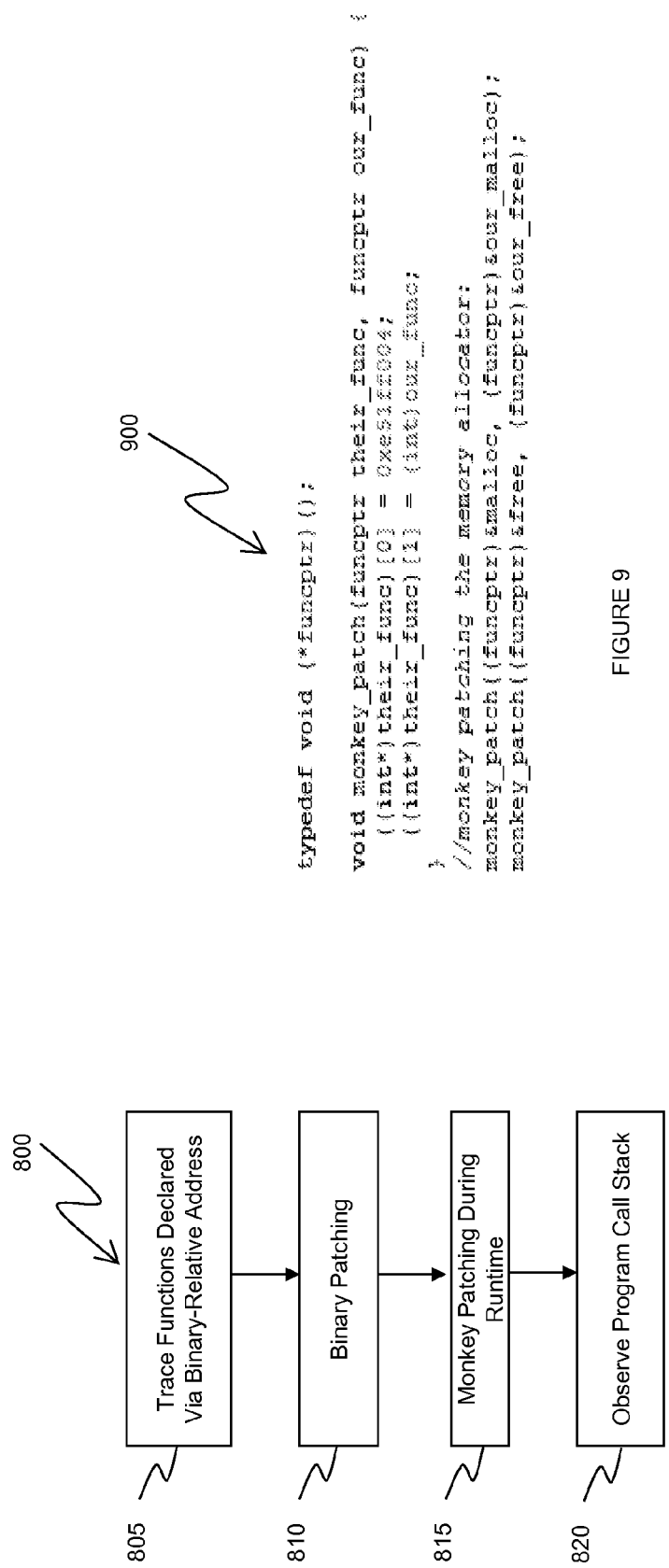

METHODS AND SYSTEMS OF FUNCTION-SPECIFIC TRACING

This application is related to co-pending non-provisional U.S. patent application Ser. No. 13/752,147 entitled "Methods and Systems of Distributed Tracing," filed Jan. 28, 2013, and U.S. patent application Ser. No. 13/752,255 entitled "Methods and Systems of Generating a Billing Feed of a Distributed Network, filed Jan. 28, 2013.

BACKGROUND

The present disclosure relates generally to tools for program development, and more particularly to systems and methods for function-specific tracing of programs.

Tracing can be one of the most important tools for program development and debugging. Typically, a debugger allows for execution of an application to be observed, recorded and used to identify particular problems with the application. Drawbacks of typical methods and programs for debugging include the speed of executing the debugging, and barriers to access program. Another drawback is that typical methods and programs for debugging output too much information. By way of example, the typical debugger/tracer traces the path of execution through a program. The problem is that most of any typical program includes the libraries, interfaces, and runtimes needed to run the program. Thus, tracking down (or at least identifying) errors in other parts of the program may be difficult. Unfortunately, most debuggers present all of the information at a user, including information about parts of a program that a programmer did not write.

A conventional approach to debugging is to place breakpoints in the code around the pieces or portions of code that are of interest, and then step through the code part by part until you get through the desired portion is reached. This approach, however, is time-consuming and it doesn't solve the problem as debugging of the undesired portions of code still occurs.

What is desired is a system and method for providing function-specific tracing that allows for the scope and depth of tracing to be controlled.

BRIEF DESCRIPTION OF THE DRAWINGS

FIG. 4 is a method for function-specific tracing according to one or more embodiments.

FIG. 5 is a method directed to dynamic runtime specific support for function-specific tracing.

FIG. 8 is a method directed to machine code runtime for function-specific tracing.

FIG. 9 is a graphical representation of patching the memory allocator for a function.

DETAILED DESCRIPTION

The following disclosure has reference to tracing and debugging programs and applications, and in particular function-specific tracing. In one embodiment, function-specific tracing can allow for one or more individual functions of a program or application to be traced and debugged on a function-by-function basis, without modifying the code or pre-arranging the functions to be traced. According to another embodiment, the scope of function tracing is dynamically limited. As such, debugging and tracing can yield only desired information, in comparison. According to another embodiment, tracing is performed in a less invasive fashion and over less of the overall codebase such that the speed of the trace program is closer to normal execution speed. In certain embodiments, function-specific tracing is performed in a distributed computing environment.

Figure 1A:
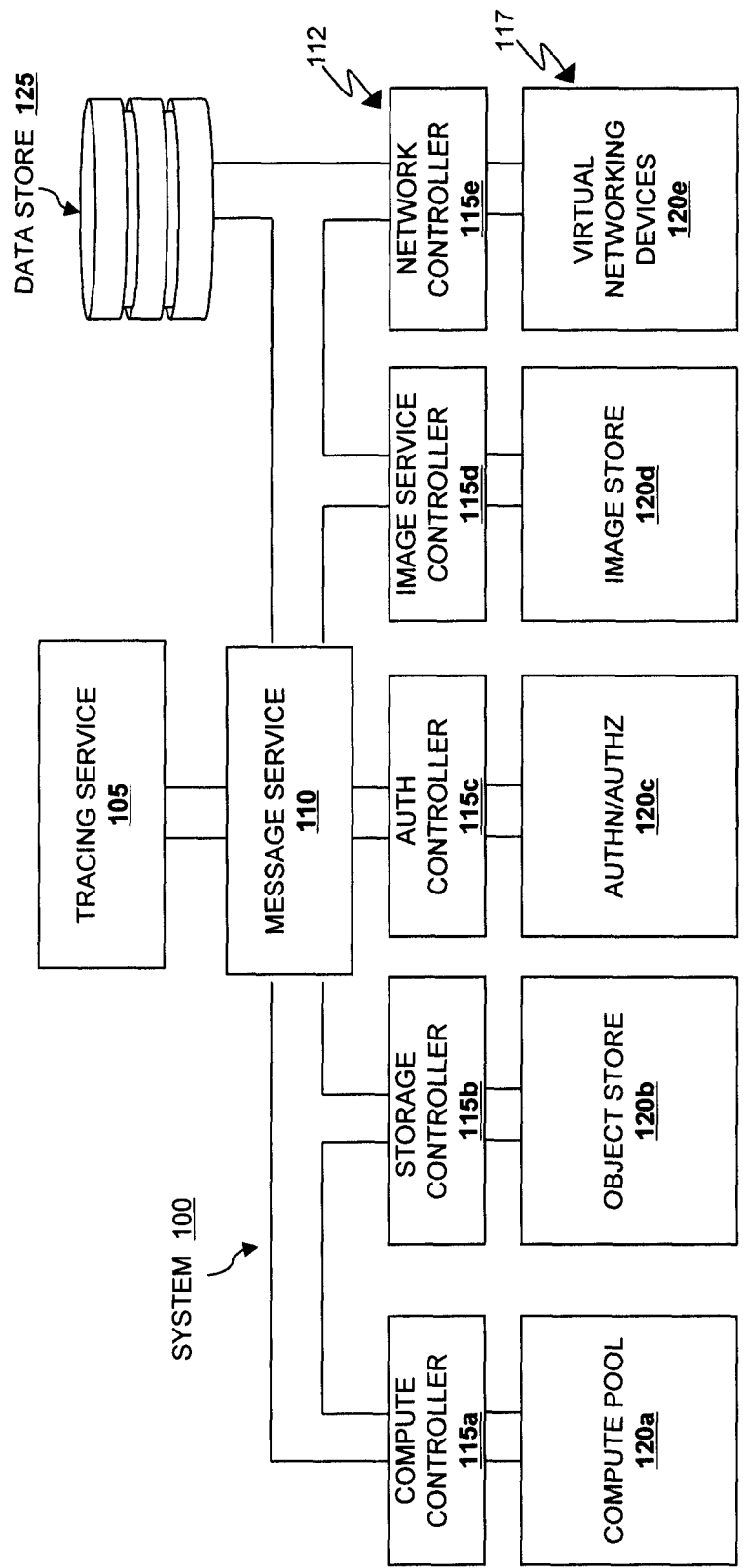
FIG. 1a is a simplified diagram of a system.

FIG. 1A illustrates a simplified diagram of a distributed application 100 that can for which various embodiments of distributed tracing systems and methods may be implemented. It should be appreciated that application 100 is provided merely as an example and that other suitable distributed applications, middleware, or computing systems can benefit from distributed tracing and/or debugging capabilities described herein. According to one embodiment, application 100 is a cloud service.

According to one embodiment, application 100 includes tracing service 105 configured to provide function-specific tracing of one or more programs, applications systems or distributed applications. As will be described in more detail below, per-function tracing can provide visibility into the performance, into the causes of errors or bugs, and increase reliability of an application. By way of example, tracing service 105 can observe messages within the distributed application across queues and from particular components of the application. As depicted in FIG. 1A, tracing service 105 interfaces with message service 110 of application 100. Message service 110 connects various subsystems of the application 100, and message service 110 is configured to pass messages relative to one or more elements of system 100.

System 100 may include one or more subsystems, such as controllers 112 and services 117. System 100 may include one or more controllers 112 for the application to be employed in a distributed architecture, such as cloud computing services. As depicted in FIG. 1A, controllers 112 include a compute controller 115a, a storage controller 115b, auth controller 115c, image service controller 115d and network controller 115e. Controllers 115 are described with reference to a cloud computing architecture in FIG. 1. By way of example, network controller 115a deals with host machine network configurations and can perform operations for allocating IP addresses, configuring VLANs, implementing security groups and configuring networks. Each of controllers 112 may interface with one or more services. As depicted in FIG. 1A, compute controller 115a interfaces with compute pool 120a, storage controller 115b may interface with object store 120b, auth controller 115c may interface with authentication/authorization controller 120c, image service controller 115d may interface with image store 120d and network controller 115e may interface with virtual networking devices 120e. Although controllers 115 and services 120 are with reference to an open architecture, it should be appreciated that the methods and systems for tracing may be equally applied to other distributed applications.

Figure 1B:
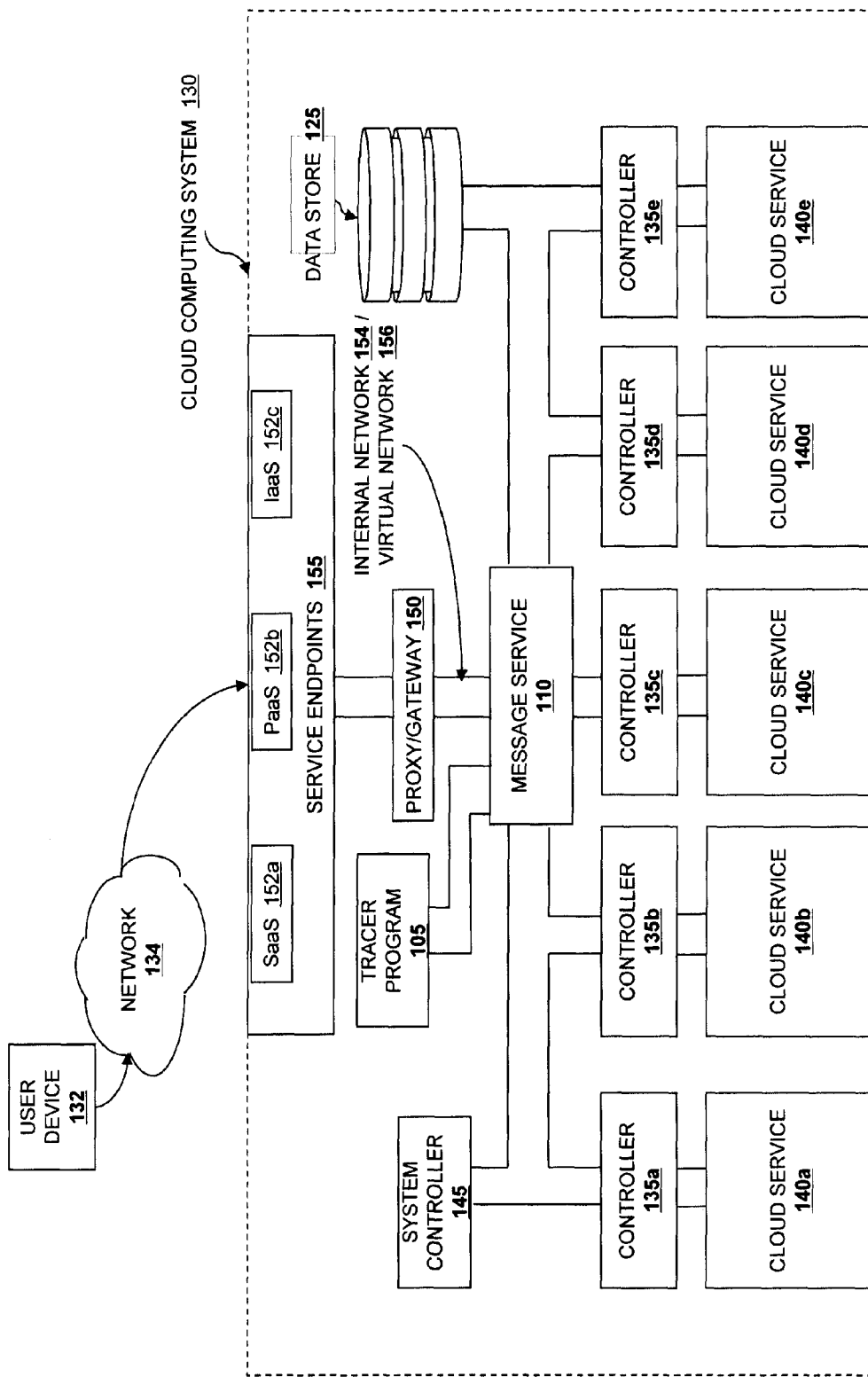
FIG. 1b is a schematic view illustrating a simplified view of a cloud computing system.

Referring now to FIG. 1B, an external view of a cloud computing system 130 is illustrated. Cloud computing system 130 includes tracing service 105 and message service 110. According to one embodiment, tracing service 105 can observe messages of cloud computing system 130 and constructs a call flow graph within each service and between services of the could computing system 130. According to another embodiment, controllers and services of the cloud computing system 130 may include tracing services to transmit message traces in response to sending or receiving of messages.

The cloud computing system 130 includes a user device 132 connected to a network 134 such as, for example, a Transport Control Protocol/Internet Protocol (TCP/IP) network (e.g., the Internet.) The user device 132 is coupled to the cloud computing system 130 via one or more service endpoints 155. Depending on the type of cloud service provided, these endpoints give varying amounts of control relative to the provisioning of resources within the cloud computing system 130. For example, SaaS endpoint 152a typically only gives information and access relative to the application running on the cloud storage system, and the scaling and processing aspects of the cloud computing system is obscured from the user. PaaS endpoint 152b typically gives an abstract Application Programming Interface (API) that allows developers to declaratively request or command the backend storage, computation, and scaling resources provided by the cloud, without giving exact control to the user. IaaS endpoint 152c typically provides the ability to directly request the provisioning of resources, such as computation units (typically virtual machines), software-defined or software-controlled network elements like routers, switches, domain name servers, etc., file or object storage facilities, authorization services, database services, queue services and endpoints, etc. In addition, users interacting with an IaaS cloud are typically able to provide virtual machine images that have been customized for user-specific functions. This allows the cloud computing system 130 to be used for new, user-defined services without requiring specific support.

It is important to recognize that the control allowed via an IaaS endpoint is not complete. Within the cloud computing system 130 are one or more cloud controllers 135 (running what is sometimes called a "cloud operating system") that work on an even lower level, interacting with physical machines, managing the contradictory demands of the multi-tenant cloud computing system 130. In one embodiment, these correspond to the controllers and services discussed relative to FIG. 1a. The workings of the cloud controllers 135 are typically not exposed outside of the cloud computing system 130, even in an IaaS context. In one embodiment, the commands received through one of the service endpoints 155 are then routed via one or more internal networks 154. The internal network 154 couples the different services to each other. The internal network 154 may encompass various protocols or services, including but not limited to electrical, optical, or wireless connections at the physical layer; Ethernet, Fiber channel, ATM, and SONET at the MAC layer; TCP, UDP, ZeroMQ or other services at the connection layer; and XMPP, HTTP, AMPQ, STOMP, SMS, SMTP, SNMP, or other standards at the protocol layer. The internal network 154 is typically not exposed outside the cloud computing system, except to the extent that one or more virtual networks 156 are exposed that control internal routing according to various rules. The virtual networks 156 typically do not expose as much complexity as may exist in the actual internal network 154; but varying levels of granularity can be exposed to the control of the user, particularly in IaaS services.

In one or more embodiments, it is useful to include various processing or routing nodes in the network layers 154 and 156, such as proxy/gateway 150. Other types of processing or routing nodes may include switches, routers, switch fabrics, caches, format modifiers, or correlators. These processing and routing nodes may or may not be visible to the outside. It is typical that one level of processing or routing nodes is internal only, coupled to the internal network 154, whereas other types of network services may be defined by or accessible to users, and show up in one or more virtual networks 156. Either of the internal network 154 or the virtual networks 156 may be encrypted or authenticated according to the protocols and services described below.

In various embodiments, one or more parts of the cloud computing system 130 is disposed on a single host. Accordingly, some of the "network" layers 154 and 156 may be composed of an internal call graph, inter-process communication (IPC), or a shared memory communication system.

Once a communication passes from the endpoints via a network layer 154 or 156, as well as possibly via one or more switches or processing devices 150, it is received by one or more applicable cloud controllers 135. The cloud controllers 135 are responsible for interpreting the message and coordinating the performance of the necessary corresponding services, returning a response if necessary. Although the cloud controllers 135 may provide services directly, more typically the cloud controllers 135 are in operative contact with the service resources 140 necessary to provide the corresponding services. For example, it is possible for different services to be provided at different levels of abstraction. For example, a service 140a may be a "compute" service that will work at an IaaS level, allowing the creation and control of user-defined virtual computing resources. In addition to the services discussed relative to FIG. 1a, a cloud computing system 130 may provide a declarative storage API, a SaaS-level Queue service 140c, a DNS service 140d, or a Database service 140e, or other application services without exposing any of the underlying scaling or computational resources. Other services are contemplated as discussed in detail below.

In various embodiments, various cloud computing services or the cloud computing system itself may require a message passing system. The message routing service 110 is available to address this need, but it is not a required part of the system architecture in at least one embodiment. In one embodiment, the message routing service is used to transfer messages from one component to another without explicitly linking the state of the two components. Note that this message routing service 110 may or may not be available for user-addressable systems; in one preferred embodiment, there is a separation between storage for cloud service state and for user data, including user service state.

In various embodiments, various cloud computing services or the cloud computing system itself may require a persistent storage for system state. The data store 125 is available to address this need, but it is not a required part of the system architecture in at least one embodiment. In one embodiment, various aspects of system state are saved in redundant databases on various hosts or as special files in an object storage service. In a second embodiment, a relational database service is used to store system state. In a third embodiment, a column, graph, or document-oriented database is used. Note that this persistent storage may or may not be available for user-addressable systems; in one preferred embodiment, there is a separation between storage for cloud service state and for user data, including user service state.

In various embodiments, it is useful for the cloud computing system 130 to have a system controller 145. In one embodiment, the system controller 145 is similar to the cloud computing controllers 135, except that it is used to control or direct operations at the level of the cloud computing system 130 rather than at the level of an individual service.

For clarity of discussion above, only one user device 132 has been illustrated as connected to the cloud computing system 130, and the discussion generally referred to receiving a communication from outside the cloud computing system, routing it to a cloud controller 135, and coordinating processing of the message via a service 130, the infrastructure described is also equally available for sending out messages. These messages may be sent out as replies to previous communications, or they may be internally sourced. Routing messages from a particular service 130 to a user device 132 is accomplished in the same manner as receiving a message from user device 132 to a service 130, just in reverse. The precise manner of receiving, processing, responding, and sending messages is described below with reference to the various discussed service embodiments. One of skill in the art will recognize, however, that a plurality of user devices 132 may, and typically will, be connected to the cloud computing system 130 and that each element or set of elements within the cloud computing system is replicable as necessary. Further, the cloud computing system 130, whether or not it has one endpoint or multiple endpoints, is expected to encompass embodiments including public clouds, private clouds, hybrid clouds, and multi-vendor clouds.

Figure 2:
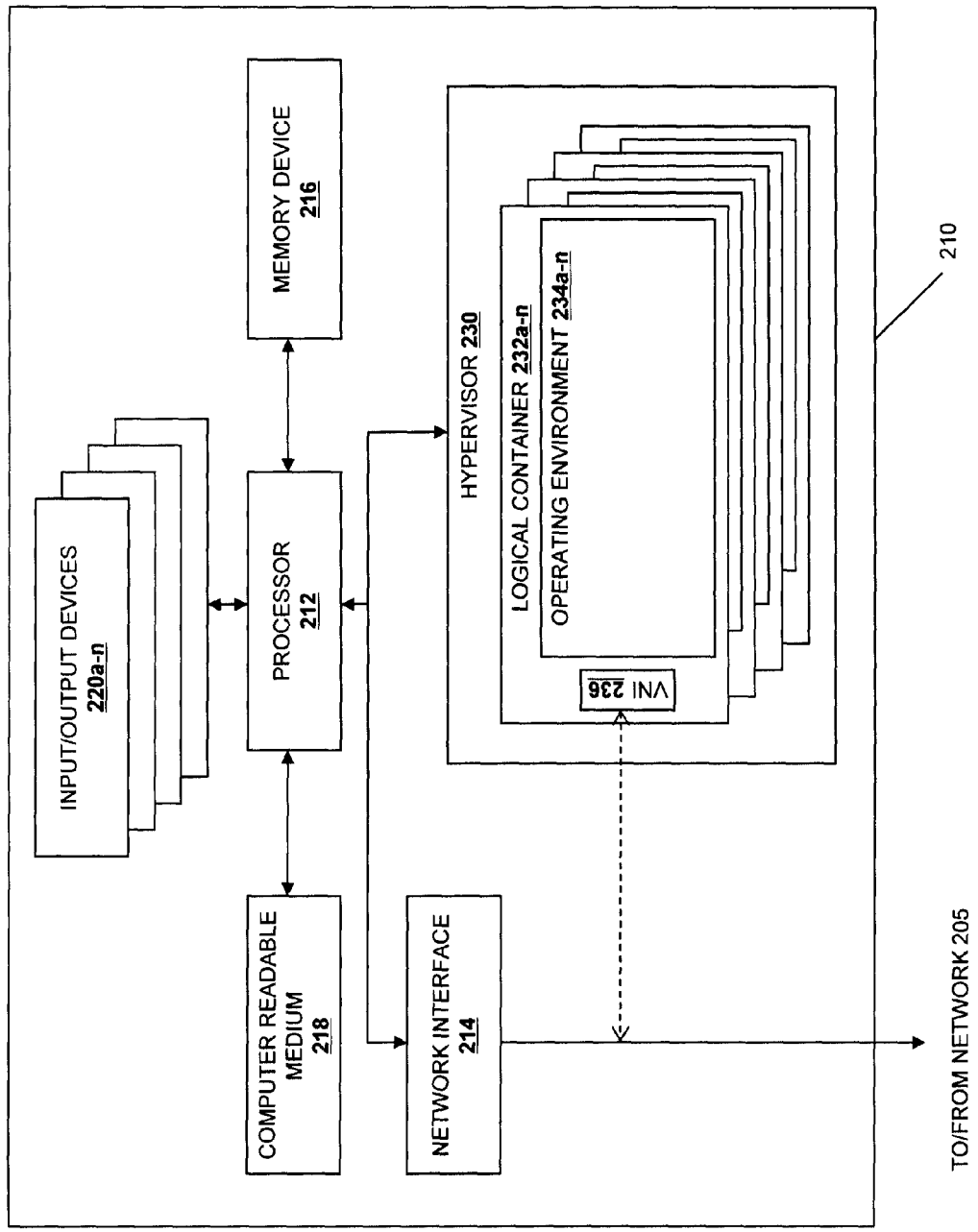
FIG. 2 is a schematic view illustrating an information processing system as used in various embodiments.

Each of the user device 132, the cloud computing system 130, the endpoints 152, the cloud controllers 135 and the cloud services 140 typically include a respective information processing system, a subsystem, or a part of a subsystem for executing processes and performing operations (e.g., processing or communicating information). An information processing system is an electronic device capable of processing, executing or otherwise handling information, such as a computer. FIG. 2 shows an information processing system 210 that is representative of one of, or a portion of, the information processing systems described above.

Referring now to FIG. 2, information processing system 210 as shown is representative of one of, or a portion of, the information processing systems described above. Diagram 200 of FIG. 2 shows an information processing system 210 configured to host one or more virtual machines, coupled to a network 205. The network 205 could be one or both of the networks 154 and 156 described above. An information processing system is an electronic device capable of processing, executing or otherwise handling information. Examples of information processing systems include a server computer, a personal computer (e.g., a desktop computer or a portable computer such as, for example, a laptop computer), a handheld computer, and/or a variety of other information handling systems known in the art. The information processing system 210 shown is representative of, one of, or a portion of, the information processing systems described above.

The information processing system 210 may include any or all of the following: (a) a processor 212 for executing and otherwise processing instructions, (b) one or more network interfaces 214 (e.g., circuitry) for communicating between the processor 212 and other devices, those other devices possibly located across the network 205; (c) a memory device 216 (e.g., FLASH memory, a random access memory (RAM) device or a read-only memory (ROM) device for storing information (e.g., instructions executed by processor 212 and data operated upon by processor 212 in response to such instructions)). In some embodiments, the information processing system 210 may also include a separate computer-readable medium 218 operably coupled to the processor 212 for storing information and instructions as described further below.

In one embodiment, there is more than one network interface 214, so that the multiple network interfaces can be used to separately route management, production, and other traffic. In one exemplary embodiment, an information processing system has a "management" interface at 1 GB/s, a "production" interface at 10 GB/s, and may have additional interfaces for channel bonding, high availability, or performance. An information processing device configured as a processing or routing node may also have an additional interface dedicated to public Internet traffic, and specific circuitry or resources necessary to act as a VLAN trunk.

In some embodiments, the information processing system 210 may include a plurality of input/output devices 220*a-n* which are operably coupled to the processor 212, for inputting or outputting information, such as a display device 220*a*, a print device 220*b*, or other electronic circuitry 220*c-n* for performing other operations of the information processing system 210 known in the art.

With reference to the computer-readable media, including both memory device 216 and secondary computer-readable medium 218, the computer-readable media and the processor 212 are structurally and functionally interrelated with one another as described below in further detail, and information processing system of the illustrative embodiment is structurally and functionally interrelated with a respective computer-readable medium similar to the manner in which the processor 212 is structurally and functionally interrelated with the computer-readable media 216 and 218. As discussed above, the computer-readable media is implemented using a hard disk drive, a memory device, and/or a variety of other computer-readable media known in the art, and when including functional descriptive material, data structures are created that define structural and functional interrelationships between such data structures and the computer-readable media (and other aspects of the system 200). Such interrelationships permit the data structures' functionality to be realized. For example, in one embodiment the processor 212 reads (e.g., accesses or copies) such functional descriptive material from the network interface 214, the computer-readable media 218 onto the memory device 216 of the information processing system 210, and the information processing system 210 (more particularly, the processor 212) performs its operations, as described elsewhere herein, in response to such material stored in the memory device of the information processing system 210. In addition to reading such functional descriptive material from the computer-readable medium 218, the processor 212 is capable of reading such functional descriptive material from (or through) the network 105. In one embodiment, the information processing system 210 includes at least one type of computer-readable media that is non-transitory. For explanatory purposes below, singular forms such as "computer-readable medium," "memory," and "disk" are used, but it is intended that these may refer to all or any portion of the computer-readable media available in or to a particular information processing system 210, without limiting them to a specific location or implementation.

The information processing system 210 includes a hypervisor 230. The hypervisor 230 may be implemented in software, as a subsidiary information processing system, or in a tailored electrical circuit or as software instructions to be used in conjunction with a processor to create a hardware-software combination that implements the specific functionality described herein. To the extent that software is used to implement the hypervisor, it may include software that is stored on a computer-readable medium, including the computer-readable medium 218. The hypervisor may be included logically "below" a host operating system, as a host itself, as part of a larger host operating system, or as a program or process running "above" or "on top of" a host operating system. Examples of hypervisors include Xenserver, KVM, VMware, Microsoft's Hyper-V, and emulation programs such as QEMU.

The hypervisor 230 includes the functionality to add, remove, and modify a number of logical containers 232a-n associated with the hypervisor. Zero, one, or many of the logical containers 232a-n contain associated operating environments 234a-n. The logical containers 232a-n can implement various interfaces depending upon the desired characteristics of the operating environment. In one embodiment, a logical container 232 implements a hardware-like interface, such that the associated operating environment 234 appears to be running on or within an information processing system such as the information processing system 210. For example, one embodiment of a logical container 234 could implement an interface resembling an x86, x86-64, ARM, or other computer instruction set with appropriate RAM, busses, disks, and network devices. A corresponding operating environment 234 for this embodiment could be an operating system such as Microsoft Windows, Linux, Linux-Android, or Mac OS X. In another embodiment, a logical container 232 implements an operating system-like interface, such that the associated operating environment 234 appears to be running on or within an operating system. For example one embodiment of this type of logical container 232 could appear to be a Microsoft Windows, Linux, or Mac OS X operating system. Another possible operating system includes an Android operating system, which includes significant runtime functionality on top of a lower-level kernel. A corresponding operating environment 234 could enforce separation between users and processes such that each process or group of processes appeared to have sole access to the resources of the operating system. In a third environment, a logical container 232 implements a software-defined interface, such a language runtime or logical process that the associated operating environment 234 can use to run and interact with its environment. For example one embodiment of this type of logical container 232 could appear to be a Java, Dalvik, Lua, Python, or other language virtual machine. A corresponding operating environment 234 would use the built-in threading, processing, and code loading capabilities to load and run code. Adding, removing, or modifying a logical container 232 may or may not also involve adding, removing, or modifying an associated operating environment 234. For ease of explanation below, these operating environments will be described in terms of an embodiment as "Virtual Machines," or "VMs," but this is simply one implementation among the options listed above.

In one or more embodiments, a VM has one or more virtual network interfaces 236. How the virtual network interface is exposed to the operating environment depends upon the implementation of the operating environment. In an operating environment that mimics a hardware computer, the virtual network interface 236 appears as one or more virtual network interface cards. In an operating environment that appears as an operating system, the virtual network interface 236 appears as a virtual character device or socket. In an operating environment that appears as a language runtime, the virtual network interface appears as a socket, queue, message service, or other appropriate construct. The virtual network interfaces (VNIs) 236 may be associated with a virtual switch (Vswitch) at either the hypervisor or container level. The VNI 236 logically couples the operating environment 234 to the network, and allows the VMs to send and receive network traffic. In one embodiment, the physical network interface card 214 is also coupled to one or more VMs through a Vswitch.

In one or more embodiments, each VM includes identification data for use naming, interacting, or referring to the VM. This can include the Media Access Control (MAC) address, the Internet Protocol (IP) address, and one or more unambiguous names or identifiers.

In one or more embodiments, a "volume" is a detachable block storage device. In some embodiments, a particular volume can only be attached to one instance at a time, whereas in other embodiments a volume works like a Storage Area Network (SAN) so that it can be concurrently accessed by multiple devices. Volumes can be attached to either a particular information processing device or a particular virtual machine, so they are or appear to be local to that machine. Further, a volume attached to one information processing device or VM can be exported over the network to share access with other instances using common file sharing protocols. In other embodiments, there are areas of storage declared to be "local storage." Typically a local storage volume will be storage from the information processing device shared with or exposed to one or more operating environments on the information processing device. Local storage is guaranteed to exist only for the duration of the operating environment; recreating the operating environment may or may not remove or erase any local storage associated with that operating environment.

Having described an example of a distributed application, various embodiments of methods and systems for function-specific tracing will now be described with references to FIGS. 3-10. Various embodiments of the methods and systems disclosed herein may permit tracing of one or more functions in a program to a desired depth of the program. In addition, a tracer may output one or more of a function call list, and call stack for tracing and debugging the program while yielding only information based on a trace profile. A function list and/or call stack may advantageously show how the program may flow through and be processed by various functions, procedures, methods, or other applicable units of software routines. In various embodiments, such a call stack is constructed at least in part by tracing function calls and returns, processes, software components, virtual machines, physical machines, software services, and network boundaries, from receiving of requests (e.g., an entry of a call to the API) all the way down to where work as performed (e.g., at worker units or other back-end processes) and back, as further described herein.

In this regard, various embodiments of the methods and systems may construct a call flow graph (may also be referred herein as a call tree) by observing request and response messages between various components of a program or application, such as a distributed application. A call flow graph is used to capture and represent causal relationships between processing activities of various components. That is, a call flow graph may encode how a processing activity of one or more components may be caused or triggered by a processing activity of one or more other components.

Figure 3:
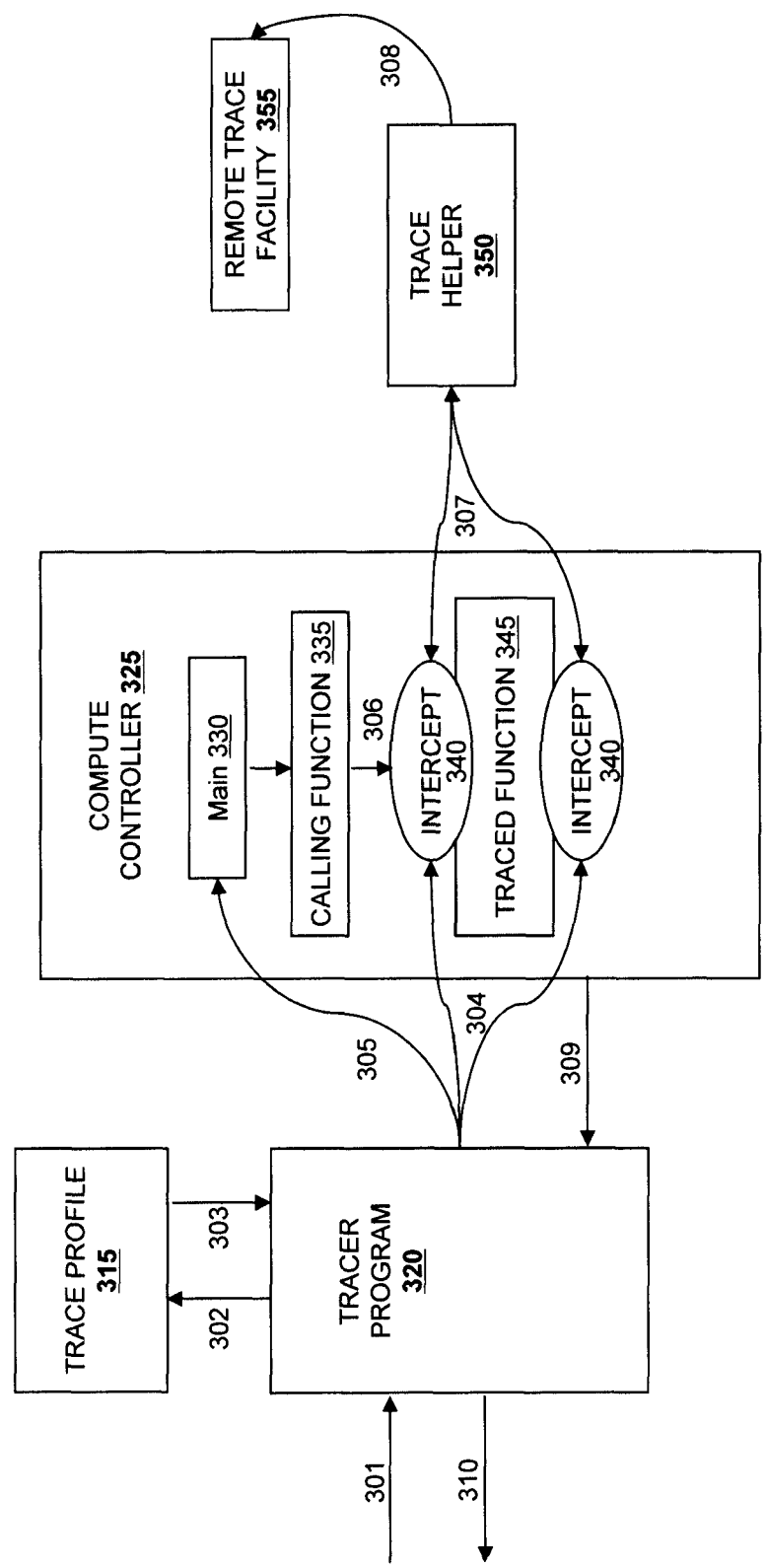
FIG. 3 shows a process for instantiating and launching a tracer according to various embodiments.

Turning now to FIG. 3, a diagram showing one embodiment of the process of instantiating and launching a tracer is shown. In FIG. 3, components may each represent a logical unit of processing. In one embodiment, tracer 320 is configured to interface with compute controller 325, wherein compute controller 325 is configured for running a target program. At time 301, a user calls tracer 320 with at least two arguments: the target program and trace profile 315. According to one embodiment, the target program is an unmodified release version of code, although the program may have one or more supporting files associated with it. At step 302 the user creates a trace profile to include a listing of which functions to trace and to what depth the functions should be followed in the program. Trace profile 315 is captured in a configuration (e.g., config) file or passed as part of calling tracer 320 (e.g., passed on the command line). At step 303, the tracer identifies the traced functions based on the description in the trace profile 315.

At step 304, tracer 320 patched the target program. In one embodiment, tracer 320 monkey-patches the target program to call into a tracer-provided routine at the entrance and exit of each traced function. Tracer 320 modifies the arguments (e.g., args) list to remove the references to tracer 320 and invokes the main function 330 of the target program. When a to-be traced function is called by calling function 335 of controller 325 and step 306, function intercepts 340 intercept the function call for traced function 345, and the call goes to a trace helper 350 at step 307. Trace helper 350 observes the state of the program, the arguments that were passed in, etc., and records those. The traced function can have different levels of scrutiny applied; it can run with all interactions observed and recorded, or it can just run and observe entrance/exit values. When the traced function is finished executing, the intercepts 640 fix the call stack as if the trace function had never run.

In certain embodiments, recording the state of the program will occur in another process so as to not slow the main program more than necessary. For example, as shown in step 308 of FIG. 1, remote trace facility 355 is configured to record function calls.

At step 309, the target program returns, and the tracer returns at step 310.

Turning now to FIG. 4, a flowchart of a function-specific tracing method 400 is illustrated, in accordance with an embodiment of the disclosure. In one example, all or part of function-specific tracing method 400 is performed to trace and/or debug a program, such as a distributed application as described above with respect to FIGS. 1-2

Method 400 is initiated at block 405 by generating a trace profile (e.g., trace profile 315) identifying one or more functions of a target program. The trace profile may identify one or more functions to trace and the depth of tracing. In one embodiment, the trace profile is a configuration file. In other embodiments, the trace profile is passed as part of calling the tracer. The trace profile may be created by a user to identify specific functions of a program for tracing.

At block 410, the trace profile and the target program are loaded into a controller or processor for debugging or tracing the target program. In one embodiment, the target program is an unmodified version of code for the program.

Traced functions in the target program can be identified at block 415 based on the trace profile. In one embodiment, traced functions are identified based on a description for each function to be traced in the trace profile. In certain embodiments, traced programs are described by the function call and/or one or more metaprogramming abstractions, such as decorators. As will be described herein, the function descriptions are generally based on the language runtime. For example, function tracing may be based on one or more of a dynamic runtime, bytecode runtime, machine code runtime and runtime in general.

According to another embodiment, a traced function is declared via its import or function access path, and identified internally the same way. In other certain embodiments, a traced function is declared using a binary-relative address, and identification of a traced function is based on a binary-relative address.

At block 420, the target program is patched to call a trace parameter for one or more functions, wherein traced functions are declared at runtime. In one embodiment, patching may include patching the target program to call into a tracer routine at the entrance and exit of each function. According to another embodiment, patching may include wrapping a traced function with a decorator. A decorator can be a function that expects another function as a parameter. By wrapping a function with a decorator, each time the original function is called, the decorated function will be called instead. As such, when calling a function returned by the decorator, the wrapper is called and arguments for the program are passed to the wrapper and in turn may be passed to the decorated function. Decorators may be employed by one or more embodiments, including implementations written supporting first class functions, such as implementations in Python, Ruby, Clojure, or Scheme, for example. One advantage of wrapping functions with a decorator is that functions may be traced without requiring the code of the program to be modified. By way of example, not modifying the program code may mean that the program does not have to be modified, but the way in which the program is executed at runtime is modified. In that fashion, development and testing of a program is more efficient without requiring program or testing breaks to be inserted into code during development. In addition, decorators may be employed to extend the behavior of a function from an external library or to debug the function.

At block 425, function calls for traced functions of the application are observed. In one embodiment, observing a traced function includes tracing bytecode before execution, and wherein function calls are inserted into the target program based on bytecode manipulation. Observing may include identifying traced functions by one or more of a trace profile by way of output files for debugging, tracing a symbolic call stack, and launching a rebase to call into a trace library. Observing may include recording arguments passed by traced functions based on the depth of tracing for each traced function. When patching at block 420 includes wrapping each function with a decorator, observing includes observing a decorated function. Observing may also include recording entrance and exit values of observed functions.

Based on method 400 of FIG. 4, one or more functions of a program are traced and/or debugged at runtime. Method 400 may also include outputting one or more of a list of the function calls for each traced function and call stack of traced function calls.

According to another embodiment, function-specific tracing is implemented across different types of runtimes, with different integration techniques. By way of example, function-specific tracing may tie into the function call architecture of a language. As such, certain details are expected to be different between runtimes. According to one embodiment, function-specific tracing may apply to one or more of dynamic runtimes, static bytecode runtimes, and machine code runtimes. It should be appreciate that implementation of identifying target programs, patching, call interception and stack fixing will require runtime-specific support.

Referring now to FIG. 5, a flowchart of a function-specific tracing method 500 is illustrated, in accordance with an embodiment of the disclosure. All or part of function-specific tracing method 500 may be performed to trace and/or debug a program, such as a distributed application as described above with respect to FIGS. 1-2.

Method 500 is directed to dynamic runtime specific support. As such, the functions for tracing may be observed directly in the source code. Although not shown in FIG. 5, method 500 may include generating a trace profile and loading a trace profile and target program may into a controller or processor, as described above with reference to blocks 405 and 410. In another embodiment, a parser or import statement is modified to modify the code to inject the appropriate tracer hooks.

Method 500 may include declaring trace functions via their path (e.g., module.submodule.function) at block 505. The target functions may be wrapped with a decorator at block 510 when a target function is imported or when they are first encountered at runtime.

At block 515, the decorated function is called instead of the traced function. The program call stack may be observed at block 520. The call stack is mutable from the machine-code and consists of a stack of frame objects, the frames including the tracer functions can be removed.

Figure 6:
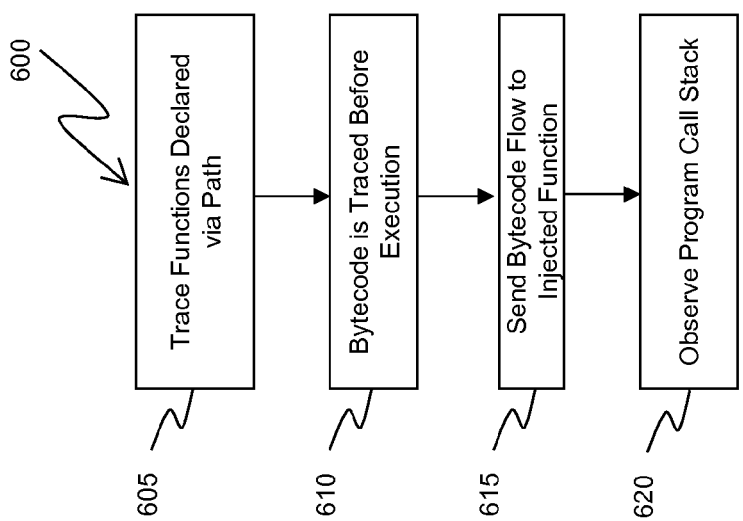
FIG. 6 is a method directed to bytecode runtime for function-specific tracing.

Referring now to FIG. 6, a flowchart of a function-specific tracing method 500 is illustrated, in accordance with an embodiment of the disclosure. All or part of function-specific tracing method 600 may be performed to trace and/or debug a program, such as a distributed application as described above with respect to FIGS. 1-2.

Method 600 is directed to bytecode runtime of the function-specific tracing. As such, the functions for tracing are inspected directly from source code. Although not shown in FIG. 6, method 600 may include generating a trace profile and loading a trace profile and target program may into a controller or processor, as described above with reference to blocks 405 and 410.

Method 600 may include declaring trace functions via their path (e.g., module.submodule.function) at block 605. The bytecode may contain metadata to identify functions to be traced. At block 610, the bytecode is traced before execution and the calls are inserted using a bytecode manipulation utility, using a function similar to that used for aspect-oriented programming dependency injection.

Figure 7:
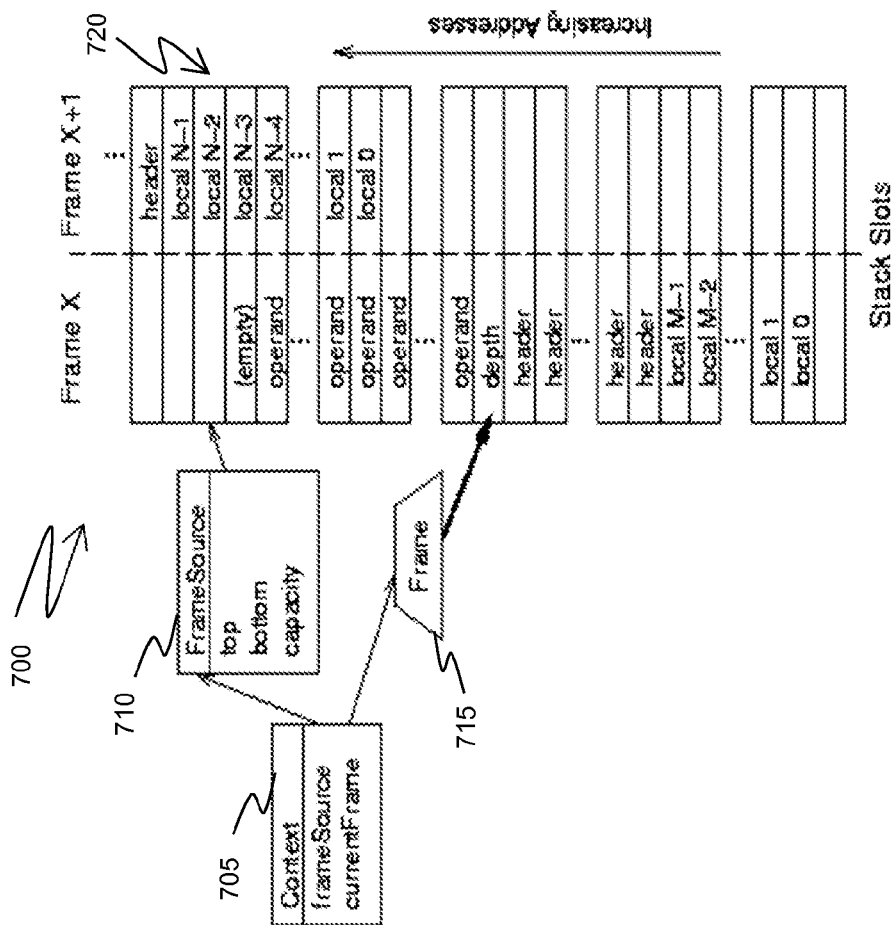
FIG. 7 illustrates a call flow graph that may be constructed by observing the message flows.

At block 615, the bytecode is sent to the injected function, not the original function. The program call stack is observed at block 620. FIG. 7 depicts a graphical representation of a call stack, in Java for example.

Referring now to FIG. 7, a graphical presentation is depicted for a call stack 1000 for a Java™ program. According to one embodiment, the call stack of the running Java program is modeled by three interfaces: Frame 715 encapsulates the data stored in a single stack frame, such as the operand stack and local variables; Frame Source 710 encapsulates the allocation and layout of Frames, controlling such things as the argument-passing mechanism; and Context 705, which encapsulates the storage and management of the call stack as well as the locking logic required by synchronized methods. The call stack can be modified to "remove" the calls from the stack by adjusting the frame source attribute and the capacity attribute. None of the stack addresses will need to be manipulated, as the information will still be there on the stack until it is garbage-collected, but it will simply be "skipped over."

Referring now to FIG. 8, a flowchart of a function-specific tracing method 500 is illustrated, in accordance with an embodiment of the disclosure. All or part of function-specific tracing method 800 is performed to trace and/or debug a program, such as a distributed application as described above with respect to FIGS. 1-2.

Method 800 is directed to machine code runtimes. With machine code runtimes, most of the metadata associated with original code has been stripped away in the compilation process. As such, the addition of some loadable metadata helpers can expose the same sort of information as other types of architectures described herein. Although not shown in FIG. 8, method 800 may include generating a trace profile and loading a trace profile and target program may into a controller or processor, as described above with reference to blocks 405 and 410.

In one embodiment, method 800 may include declaring trace function locations using a binary-relative address at block 805. In another embodiment, a second executable produced by the same program code is included alongside the target executable, wherein the second executable includes debugging metadata. The second executable is implemented in one or more formats such as DWARF, stabs or .DBG. The functions may then be identified via the trace profile are located in the debugging output files. In yet another embodiment, bytecode runtime is implemented if the code is available to trace the symbolic call stack for the code, such as C code. The call may form the state machine can be tracked through transitions. When the trace function is reached (based on the state machine location) that call is redirected to the trace helper library (e.g., trace helper 350).

At block 815, the method includes monkey patching the machine code at runtime by changing the target in a jump instruction. FIG. 9 depicts a graphical representation 900 of monkey patching the memory allocator for a function such as the monkey patching at block 815 of method 800. At block 820, the program call stack is observed. Based on the implementation of the machine code, modification of the program arguments may occur automatically (via the JMP target) or based on redirection when the call occurs. As such, call stack fixing may not be required as stack frames may not exist in a C program in the same sense as a higher-level runtime. To the extent call stack fixing is required, fixing is similar to JAVA fixing as described above with reference to FIG. 4.

Figure 10:
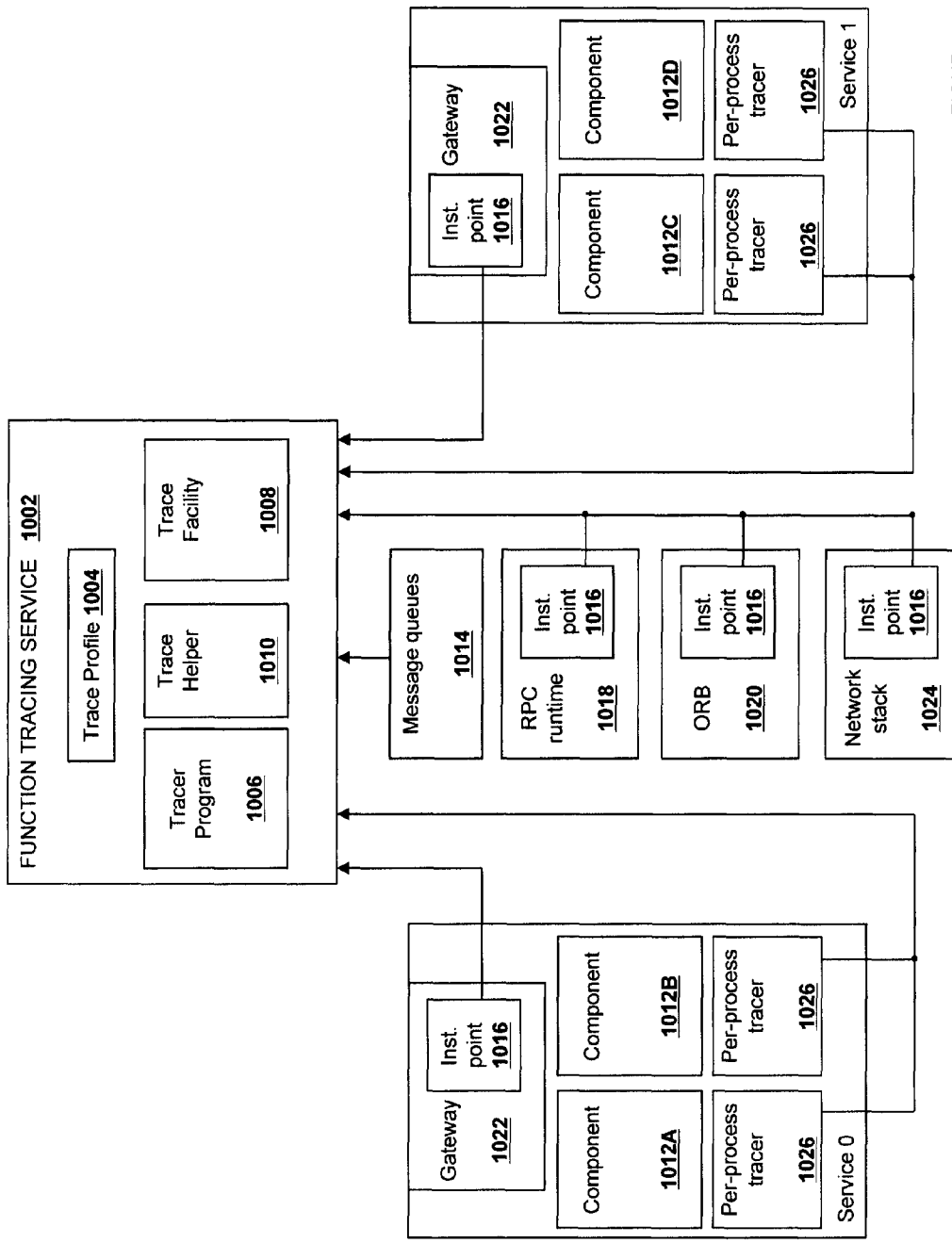
FIG. 10 illustrates a block diagram of a function-specific tracing system.

Referring now to FIG. 10, a block diagram is illustrated of a function-specific tracing system, in accordance with an embodiment of the disclosure. The function-specific tracing system is configured to construct a call flow graph or a distributed call stack. The function-specific tracing system may comprise, in one embodiment, a function-specific tracing service 1002, trace profile module 1004, tracer module 1016, trace facility 1018, and trace helper module 1010. In one embodiment, the function-specific tracing system is implemented on top of or as part of, for example, distributed application FIG. 1. It will be appreciated that distributed tracing system in no way is limited to or requires a distributed application, and that distributed tracing system is implemented on top of or as part of any other suitable distributed application, middleware, or computing system to beneficially provide thereto distributed tracing and/or debugging capabilities described herein.

In one embodiment, function-specific service 1002 is configured to subscribe or otherwise attach to one or more message queues 1014 to observe messages communicated among components 1012A-1012D through message queues 1014. For example, function-specific service 1002 is configured to observe messages by performing the subscription-based observation techniques and operations described above in connection with block 1302 of FIG. 13.

In one embodiment, function-specific service 1002 is configured to receive, from instrumentation points, message traces describing messages being communicated among components 1012A-1012D. In this regard, function-specific service 1012 is configured to merge message traces from different instrumentation points 1016. Further in this regard, function-specific service 1012 is configured to merge message traces received from instrumentation points 1016 with message traces obtained by observing message queues 1014. For example, function-specific service 1002 is configured to implement the merging and message representation techniques and operations.

In one embodiment, instrumentation points 1016 are located at various tap points described above with respect to block 1302 of FIG. 13, including an RPC runtime 1018, an ORB 1020, a HTTP or remote database gateway 1022, and a network protocol stack 1024. In one embodiment, instrumentation points 1016 is configured to generate and transmit message traces to function-specific service 1002, the message traces describing request/response messages that pass through the corresponding tap points.

Per-process tracer 1026 may be configured to trace a call stack (e.g., an execution stack, a runtime stack) of a process of component 1012A-1012D by running the process under its environment, in a manner similar to call stack tracing in conventional single process tracers or debuggers. In one embodiment, per-process tracer 1026 is further configured to transmit a description of the traced call stack to function-specific service in a manner described with respect to the distributed call stack generation. In one embodiment, function-specific system 1000 may comprise as many per-process tracers 1026 as the number of processes that may run in the underlying distributed application. In other embodiments, there may be per-process tracers for some but not all of the processes that may run in the underlying distributed application.

In one embodiment, function-specific service 1002 may comprise appropriate data structures and related functions for encoding, constructing, and/or storing an observed sequence of messages 1004, per-process call stacks 1006, probabilistic models 1008, and call flow graphs 1010. Thus, function-specific service 1000 is configured to observe and store messages sent and received among components 1012A-1012D, generate a probabilistic model of a call flow, construct a call flow graph based on the probabilistic model, and receive and combine the descriptions of the per-process call stacks to generate a distributed call stack, in a manner consistent with the various techniques and operations. A distributed call stack is utilized to show call flows among several functions (e.g., subroutines, procedures, methods) within and between processes, permitting tracing of calls from receiving of requests to a distributed application (e.g., an entry of a call to the API) all the way down to where work as performed (e.g., at worker units or other back-end processes) and back.

In one embodiment, function-specific tracing service 1002 is implemented as an electrical circuit or as software instructions to be used in conjunction with a hardware processor to create a hardware-software combination that implements the specific functionality described herein. To the extent that one embodiment includes computer-executable instructions, those instructions may include software that is stored on a computer-readable medium. Further, one or more embodiments have associated with them a buffer. The buffer can take the form of data structures, a memory, a computer-readable medium, or an off-script-processor facility. For example, one embodiment uses a language runtime as an instruction processor, running as a discrete operating environment, as a process in an active operating environment, or can be run from a low-power embedded processor. In a second embodiment, the instruction processor takes the form of a series of interoperating but discrete components, some or all of which may be implemented as software programs. In another embodiment, the instruction processor is a discrete component, using a small amount of flash and a low power processor, such as a low-power ARM processor. In a further embodiment, the instruction processor includes a rule engine as a submodule as described herein.

In though illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of function-specific tracing in a distributed application, the method comprising:
    generating a trace profile identifying one or more functions of a target program of the distributed application, wherein the trace profile identifies one or more functions to trace using a binary-relative address for each function to be traced and depth of tracing for each function to be traced;
    patching, by a tracer process, the target program of the distributed application in accordance with the generated trace profile to trace the one or more functions to the identified depth for each of the one or more functions;
    loading, into a compute controller in a distributed computing system, the patched target program;
    executing, by the compute controller, the patched target program;
    identifying, by the compute controller, traced functions in the patched target program based on a binary-relative address, wherein the traced functions are identified at runtime;
    observing function calls for traced functions of the target program, wherein observing function calls for traced functions of the target program includes executing the patched target program by a first process of the compute controller, and wherein observing function calls for traced functions of the patched target program is performed by a second process;
    constructing a per-process call stack for each traced function;
    combining, by the compute controller, the per-process call stacks to generate a distributed call stack, wherein the distributed call stack is utilized to show call flows among several functions within and between processes, permitting tracing of calls from receiving of requests to the distributed application; and
    fixing, by the compute controller, a call stack after execution of the traced functions.

2. The method of claim 1, wherein the trace profile is a configuration file or passed as part of calling the tracer.

3. The method of claim 1, wherein the target program is an unmodified version of code for the program.

4. The method of claim 1, wherein traced functions are identified based on a description for each function to be traced in the trace profile.

5. The method of claim 1, wherein a traced function is declared via its path, and identification of a traced function is based on a declared path.

6. The method of claim 1, wherein patching includes patching the target program to call into a tracer routine at the entrance and exit of each function.

7. The method of claim 1, wherein patching includes wrapping a traced function with a decorator, and wherein observing includes observing a decorated function.

8. The method of claim 1, wherein observing a traced function includes tracing bytecode before execution, and wherein function calls are inserted into the target program based on bytecode manipulation.

9. The method of claim 1, wherein observing includes identifying traced functions by one or more of a trace profile by way of output files for debugging, tracing a symbolic call stack, and launching a rebase to call into a trace library.

10. The method of claim 1, wherein observing includes recording arguments passed by traced functions based on the depth of tracing for each traced function.

11. The method of claim 1, wherein observing includes recording entrance and exit values of observed functions.

12. The method of claim 1, further comprising outputting one or more of a list of the function calls for each traced function and call stack of traced function calls.

13. A system comprising:
one or more processors; one or more memory devices; and plurality of modules including:
a trace profile module to generate a trace profile identifying one or more functions of a target program, wherein the trace profile identifies one or more functions to trace using a binary-relative address for each function to be traced and depth of tracing for each function to be traced;
a tracer module to patch the target program in accordance with the generated trace profile to trace the one or more functions to the identified depth for each of the one or more functions;
a module to load, into a controller module of a distributed computing system, the patched target program; and
a controller module to:
execute the patched target program;
identify traced functions in the patched target program based on the trace profile and based on a binary-relative address, wherein the traced functions are declared at runtime;
observe function calls for traced functions of the target program by executing the patched target program by a first process of the controller module;
cause observing of function calls for traced functions of the patched target program;
construct a per-process call stack for each traced function;
combine the per-process call stacks to generate a distributed call stack, wherein the distributed call stack is utilized to show call flows among several functions within and between processes, permitting tracing of calls from receiving of requests to the target program; and
fix a call stack after execution of the traced functions.

14. The system of claim 13, wherein the trace profile is a configuration file or passed as part of calling the tracer.

15. The system of claim 13, wherein the target program is an unmodified version of code for the program.

16. The system of claim 13, wherein traced functions are identified based on a description for each function to be traced in the trace profile.

17. The system of claim 13, wherein a traced function is declared via its path, and identification of a traced function is based on a declared path.

18. The system of claim 13, wherein patching includes patching the target program to call into a tracer routine at the entrance and exit of each function.

19. The system of claim 13, wherein patching includes wrapping a traced function with a decorator, and wherein observing includes observing a decorated function.

20. The system of claim 13, wherein observing a traced function includes tracing bytecode before execution, and wherein function calls are inserted into the target program based on bytecode manipulation.

21. The system of claim 13, wherein observing includes identifying traced functions by one or more of a trace profile by way of output files for debugging, tracing a symbolic call stack, and launching a rebase to call into a trace library.

22. The system of claim 13, wherein observing includes recording arguments passed by traced functions based on the depth of tracing for each traced function.

23. The system of claim 13, wherein observing includes recording entrance and exit values of observed functions.

24. The system of claim 13, wherein the controller module is further configured to output one or more of a list of the function calls for each traced function and call stack of traced function calls.

25. A non-transitory computer-accessible storage medium storing program instructions that when executed by a computer cause the computer to implement a function-specific tracing of a program, including instructions to:
generate a trace profile identifying one or more functions of a target program, wherein the trace profile identifies one or more functions to trace using a binary-relative address for each function to be traced and depth of tracing for each function to be traced;
patch, by a tracer process, the target program in accordance with the generated trace profile to trace the one or more functions to the identified depth for each of the one or more functions;
load, into a compute controller in a distributed computing system, the patched target program;
execute, by the compute controller, the patched target program;
identify, by the compute controller, traced functions in the patched target program based on a binary-relative address, wherein the traced functions are identified at runtime;
observe function calls for traced functions of the target program by executing the patched target program by a first process of the controller module and observing function calls for traced functions of the patched target program by a second process of the controller module;
construct a per-process call stack for each traced function;
combine, by the compute controller, the per-process call stacks to generate a distributed call stack, wherein the distributed call stack is utilized to show call flows among several functions within and between processes, permitting tracing of calls from receiving of requests to the target program; and
fix, by the compute controller, a call stack after execution of the traced functions.

* * * * *